United States Patent [19]

Schwarz

[11] Patent Number: 4,978,895

[45] Date of Patent: Dec. 18, 1990

[54] ELECTRONIC CONTROL CIRCUIT FOR BRUSHLESS DIRECT CURRENT MOTOR

[76] Inventor: Marcos G. Schwarz, Rua General Osorio, Conjunto Belvedere 02, 89200 Joinville SC, Brazil

[21] Appl. No.: 421,605

[22] Filed: Oct. 16, 1989

[30] Foreign Application Priority Data

Oct. 17, 1988 [BR] Brazil .................................. 8805485

[51] Int. Cl.$^5$ .......................................... H02P 6/02
[52] U.S. Cl. ..................................... 318/254; 318/138
[58] Field of Search ......................... 318/138, 254, 439

[56] References Cited

U.S. PATENT DOCUMENTS

| 4,692,674 | 9/1987 | Packard et al. ..................... 318/254 |
| 4,743,815 | 5/1988 | Gee et al. ......................... 318/138 X |

FOREIGN PATENT DOCUMENTS

| 54-97723 | 8/1979 | Japan .................................... 318/138 |
| 57-160385 | 10/1982 | Japan .................................... 318/254 |
| 61-191290 | 8/1986 | Japan .................................... 318/254 |
| 62-141992 | 6/1987 | Japan .................................... 318/254 |
| 63-99795 | 5/1988 | Japan .................................... 318/254 |

*Primary Examiner*—Bentsu Ro
*Attorney, Agent, or Firm*—Darby & Darby

[57] ABSTRACT

An electronic control circuit for brushless direct current motor, of the type having a coiled stator and a permanent magnet rotor, with an inverter circuit (10) feeding current to stator coils (21, 22, 23). A rotor-stator relative position detecting circuit (30) and a central controller (70) processes current information fed by the inverter (10), on the reference speed and the relative rotor-stator position, and sends command signals to inverter (10). The detecting circuit (30) has low pass filters (1, 2, 3) connected to terminals ($\emptyset_1$, $\emptyset_2$, $\emptyset_3$) for supplying current to the motor coils, and with the output ($F_1$, $F_2$, $F_3$) of each low pass filter being connected to the noninverting input of a corresponding voltage comparator (59, 60, 61) through a capacitor (56). The inverting input ($M_1$, $M_2$, $M_3$) of each voltage comparator (59, 60, 61) receives the output of AC corresponding filter through a capacitor (56) which causes a phase delay and also through a resistor (54) of an integrating resistor circuit interconnected at a common point (M). The detecting circuit (30) further comprises another resistor circuit (55) which connects said point (M) to each inverting input of the voltage comparators.

6 Claims, 4 Drawing Sheets

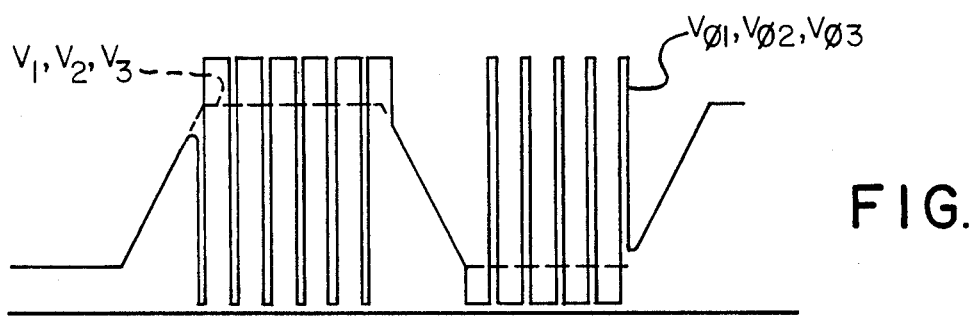
FIG. 2
FIG. 4
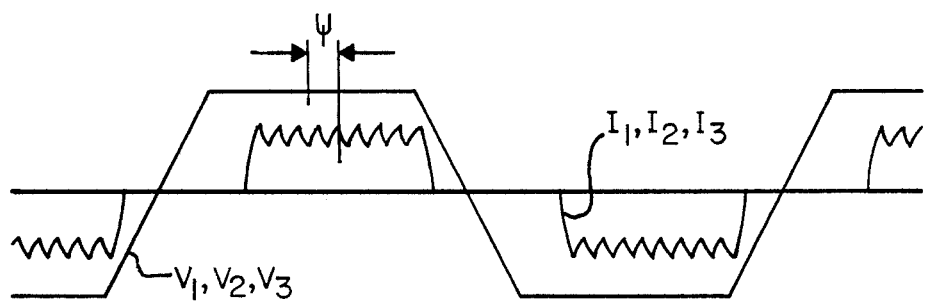
FIG. 5
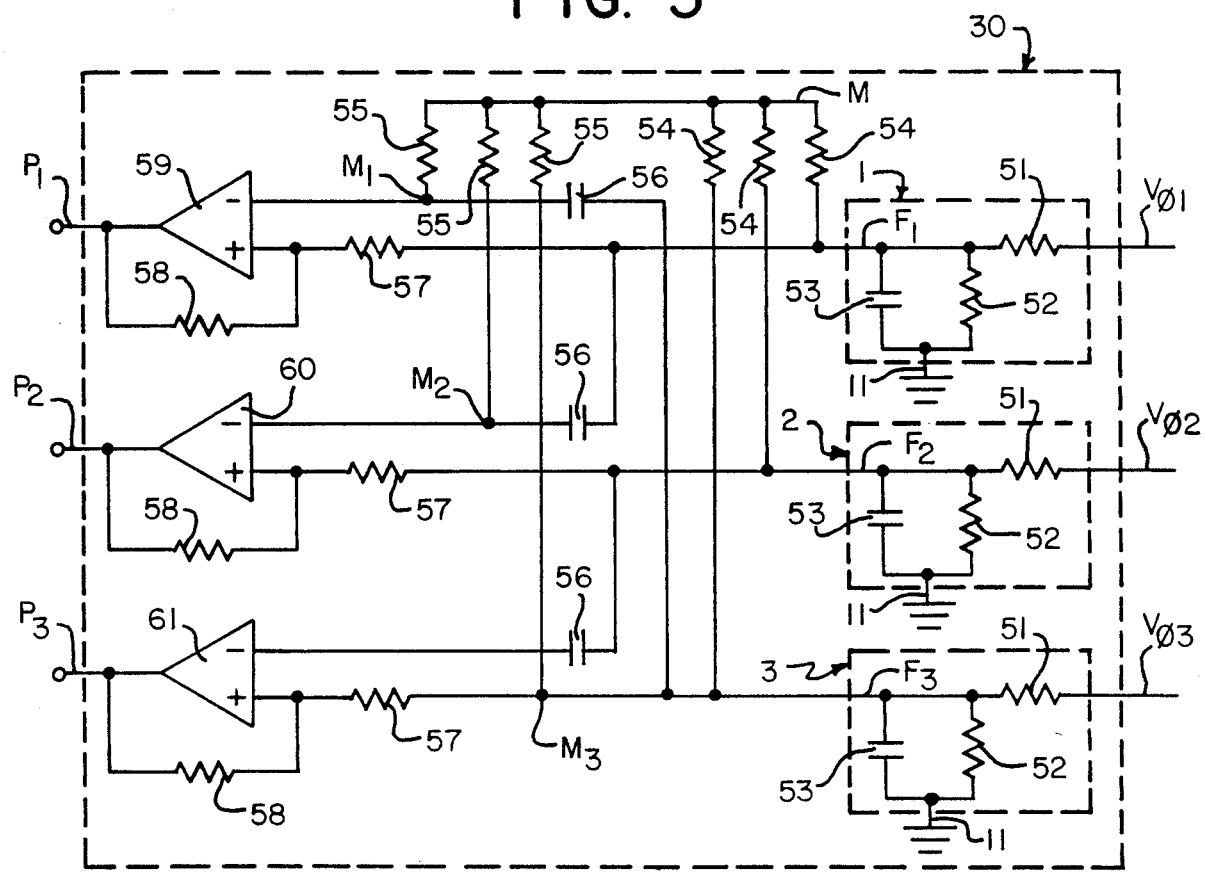

FREQUENCY

FREQUENCY

ELECTRONIC CONTROL CIRCUIT FOR BRUSHLESS DIRECT CURRENT MOTOR

BACKGROUND OF THE INVENTION

This invention refers to a control circuit for a brushless direct current motor and, more specifically, to an electronic circuit for detecting the rotor position by induction voltages.

Brushless direct current motors are of interest in applications requiring reliability and high efficiency such as household appliances, pumps and fans.

Said motors are substantially formed of a stator having coils, a permanent magnet rotor, an inverter feeding current to the stator coils, a position sensor which gives information on the time and period each coil assembly has to be kept powered and a central control which processes current, speed and position of the rotor information and send command pulses to the inverter.

In a circuit control for such motors, the current control during the energization period of each coil assembly is obtained by pulse width modulation of the voltage at a frequency higher than the fundamental wave of the voltage induced to the coil by the moving rotor.

The rotor position detection by inducted voltages is obtained by attenuating the high frequency components coming from the voltage modulation on the coils and then comparing the resulting signals among themselves or comparing each of them with the average of same, thus generating logic signals corresponding to the rotor position.

This rotor position detection technique is mentioned in Japanese document Kokai No. 5280415 and Kokai No. 555035 (A), which employ passive low pass filters of first and second orders RC type to attenuate the high frequency components coming from the voltage modulation on the coils. Such filters, although attenuating satisfactorily the high frequency components, have the drawback of introducing phase displacements to the filtered signals, which phase displacements vary with the frequency and therefore with the rotor speed.

The phase displacement of said filtered signals causes, in turn, the phase displacement of logic signals corresponding to the rotor position in relation to the effective position thereof, feeding therefore, displaced current to the coils in relation to the induced voltage in the same coils. This phase displacement between the fed currents and the induced voltages degrades the motor performance because said motor is not operating at the maximum efficiency condition.

A further control circuit is proposed by Japanese document Kokai 51150624. Such document shows a motor being driven by a cycle converter provided with thyristors wherein the control of the current feeding angle on the coils is efficiently made in a wide speed band by means of a circuit assembly. Said circuit although controlling efficiently the current feeding angle on the coils has the drawback of being complex and is high in cost due to several components of which it is made.

OBJECTS OF THE INVENTION

The object of this invention is to propose a control circuit for a brushless direct current motor which is able to feed current in phase with induced voltages in the coils, and thus maintaining the best performance as possible throughout the useful speed range.

It is further a more specific object of this invention to provide a rotor position detecting circuit which is able to attenuate the high frequency components coming from the voltage modulation on the motor coils without causing phase displacement of the logic signals corresponding to the rotor position.

It is another object of this invention to overcome the technical failures as hereinbefore described, by using a simple electronic circuit and a reduced number of components.

BRIEF DESCRIPTION OF THE INVENTION

These objects are obtained through an electronic circuit control for a brushless direct current motor and including a coiled stator and a permanent magnet rotor. The circuit includes an inverter which feeds current to the coils; a relative rotor-stator position detecting circuit, which gives, from induced voltages, information of the time and period that each coil assembly has to remain powered, and a central control which processes information on current which is fed by the inverter to stator coils, on reference speed and on rotor position, sending command pulses to the inverter.

According to the invention, the rotor position detecting circuit essentially uses low pass filters of the RC type which are connected to the respective feeding terminals of the motor coils. The low pass filters output are connected to the noninverting inputs of corresponding voltage comparators, with said comparators being provided with hysteresis. The low pass filter outputs are also connected to a resistor network which is connected to a common point. Another resistor network connects this common point to each inverting input of the voltage comparators. Each low pass filter output is also connected at least by a capacitor to the inverting input of the comparator immediately prior to the comparator corresponding to each filter.

Contrary to other circuits using low pass filters for RC type for attenuation of high frequency components, in the circuit as above described, the logic signals corresponding to the relative rotor-stator position are always generated in phase with the effective rotor position, thereby allowing the currents fed to the motor coils to be in phase with the voltage induced therein. This way, it is possible to have an efficient control of the motor in all the useful range of motor speeds.

A further advantage of the proposed circuit is that said circuit has no need of any additional circuit for compensation of phase errors, which circuits are usually used for obtaining a better performance of the motor.

The circuit as described is of a simple construction and has a reduced number of components.

BRIEF DESCRIPTION OF THE DRAWINGS

The invention will hereinafter be described with reference to the attached drawings, in which:

FIG. 2 shows a graph of voltage and phase as a function of time and its average value in relation to the negative potential in the voltage supply;

FIG. 4 shows a graph for the voltage induced in a phase and the current being in the same phase, illustrating the phase angle between the same;

FIG. 5 illustrates the position detecting circuit in the preferred form thereof;

DETAILED DESCRIPTION OF THE INVENTION

Figure 1:
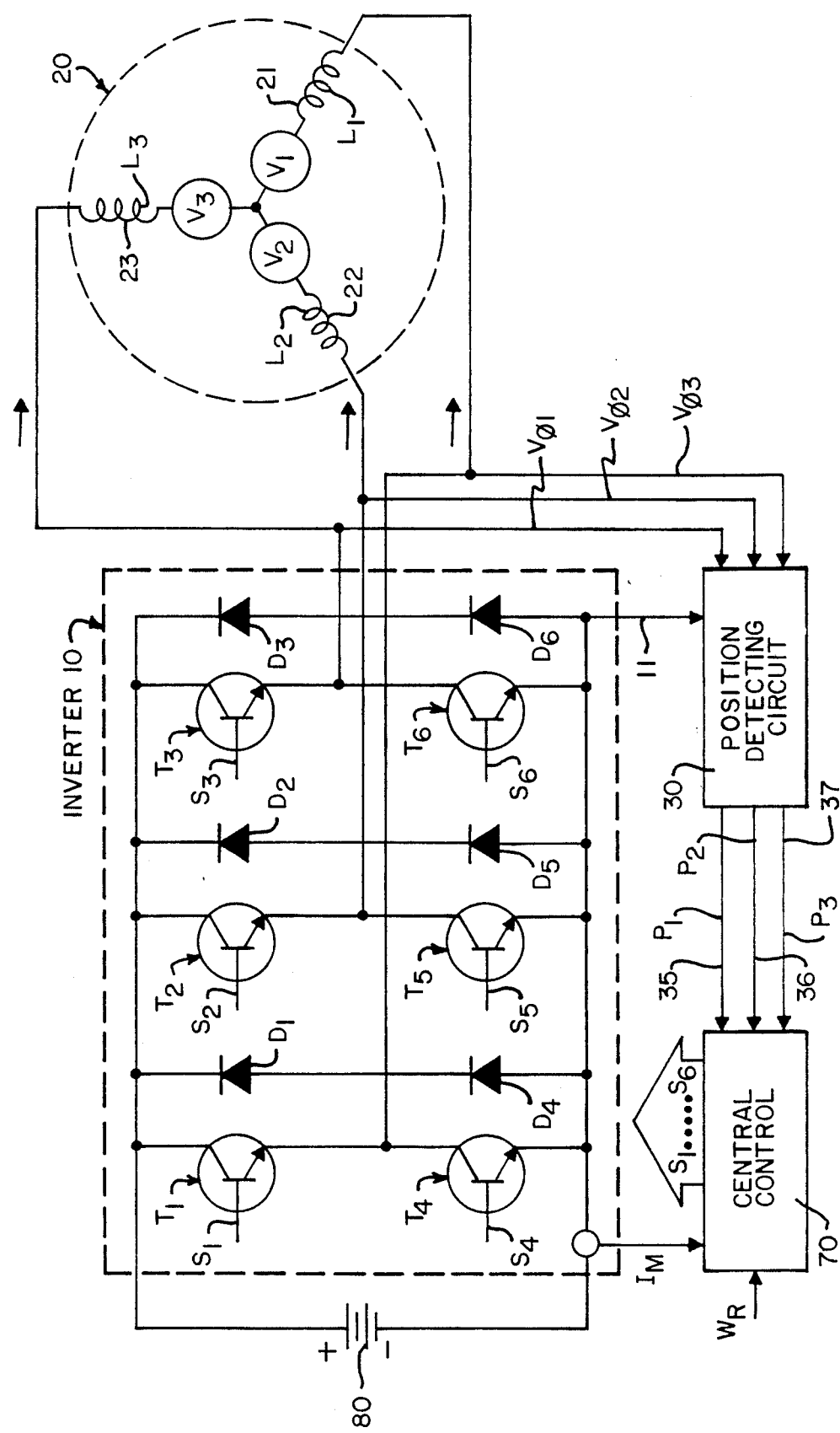
FIG. 1 illustrates a block diagram of motor, inverter and central control assembly of the type as proposed by this invention.

As illustrated by FIG. 1, an inverter 10 supplies current to three phases of the brushless direct current motor 20, which is formed of three stator windings 21, 22 and 23 herein represented by inductors $L_1$, $L_2$, $L_3$. The voltage supplies $V_1$, $V_2$, $V_3$ represent the respective voltages being induced by the moving rotor and having its voltage and frequency value linearly depending upon the rotor speed.

Voltages $V_{\phi 1}$, $V_{\phi 2}$ and $V_{\phi 3}$ respectively in phases $\phi_1$, $\phi_2$ and $\phi_3$, are sent to the rotor relative position detecting circuit 30 by induced voltages. The negative terminal 11 of the power supply 80 which is the reference potential point to all of the circuits is also connected to the detecting circuit 30.

The rotor position detecting circuit 30 through terminals $P_1$, $P_2$ and $P_3$ send three logic signals 35, 36 and 37 respectively to the central control 70 which, as a function of said information and the current values $I_m$ and the reference speed $W_R$, sends the command signals $S_1$ to $S_6$ to the respective control electrode (base) of a corresponding one of six transistors $T_1$ to $T_6$ of the inverter 10.

By reference to FIG. 5, the preferred embodiment of the invention has three voltage dividers, each of them being formed of resistors 51 and 52, which reduce the $V_{\phi 1}$, $V_{\phi 2}$ and $V_{\phi 3}$ voltages of each phase to levels proper to the electronic circuit. There are three low pass fundamental frequency filters 1, 2 3, each being formed by a capacitor 53, and the pair of resistors 51 and 52. The filters are designed to cause the induced voltages signals $V_1$, $V_2$, $V_3$ to pass and attenuate most of the components of high frequency from the voltage modulation on motor inductors $L_1$, $L_2$ and $L_3$.

Figure 6:
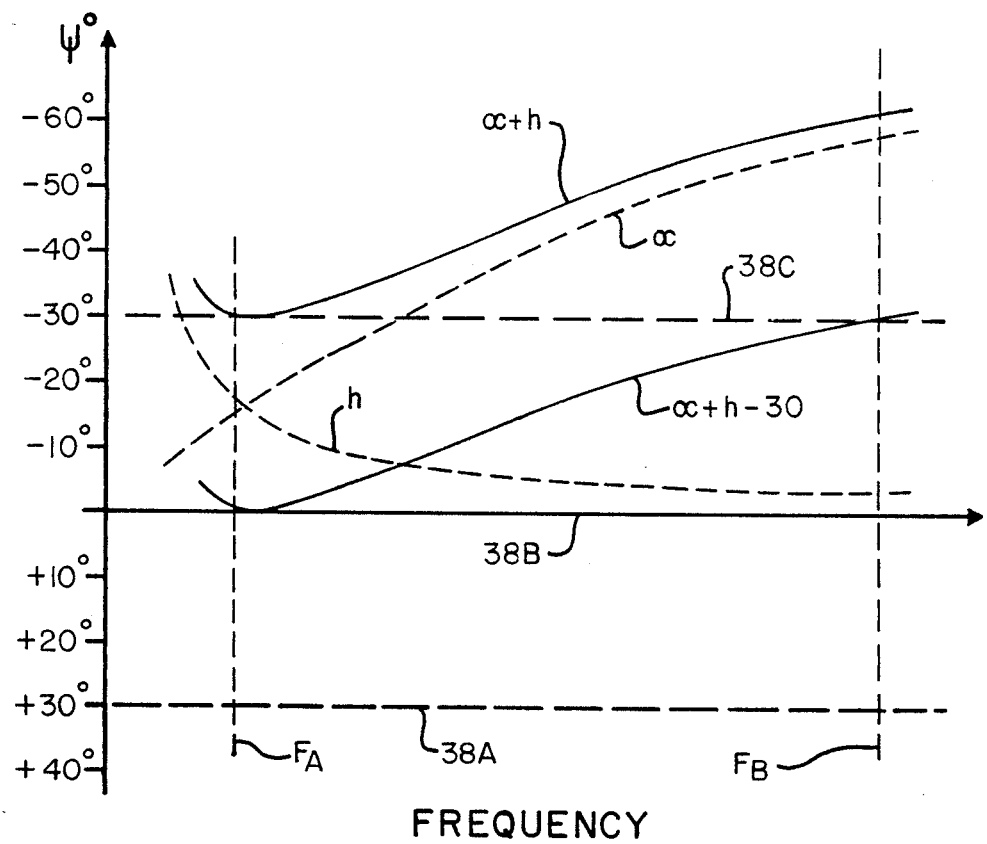
FIG. 6 shows a graph for the angular evolution of voltage signals in the position detecting circuit as a function of the fundamental frequency of the induced voltage.

After this filtering, signals $V_{F1}$, $V_{F2}$ and $V_{F3}$ are obtained in the points $F_1$, $F_2$ and $F_3$, respectively (FIGS. 5 and 3) which are a recomposition of the signals of induced voltages $V_1$, $V_2$ and $V_3$ delayed in phase by an angle which is function of the characteristics of low pass filters 1, 2, 3 and of the fundamental frequency of the induced voltages $V_1$, $V_2$, $V_3$ as illustrated by FIG. 6. The voltage of each of the points $F_1$, $F_2$ and $F_3$ is applied to the non-inverting (+) input of a respective voltage comparator 59, 60 through a resistor 57.

An average value $V_M$ is obtained from the recomposed signals $V_{F1}$, $V_{F2}$ and $V_{F3}$ (FIGS. 3 and 5) in the common point M of resistors 54 connected to the outputs $F_1$, $F_2$ and $F_3$ of the low pass filters 1, 2 and 3. The resistor value 54 changes the characteristics of the low pass filters already described, and that has to be considered. Such average value $V_M$ is applied to the inverting (−) inputs comparator 59, 60 and 61 through resistors 55. The value of such resistors 55 is higher than that of the resistors 54 so that the voltage changes in points $M_1$, $M_2$ and $M_3$ do not alter significantly the average voltage $V_m$.

Capacitors 56 are also connected to points $M_1$, $M_2$ and $M_3$ which, together with resistors 55, form three high pass filters which will feed to the comparator inverting inputs 59, 60 and 61 voltages different that the average value $V_M$, proportionally to the increase in the frequency of the induced voltages $V_1$, $V_2$ and $V_3$. That is, the inverting input of comparator 61 also receives the high pass filtered voltage from $F_1$ ($VF_1$), comparator 60 the high pass filtered version of $F_3$ ($VF_3$) and comparator 58 the high filtered version of $F_2$ ($VF_2$). Each comparator conducts to produce a logic output signal when the voltage on the noninverting (+) input is of greater magnitude than that on the inverting input (−).

Figure 3:
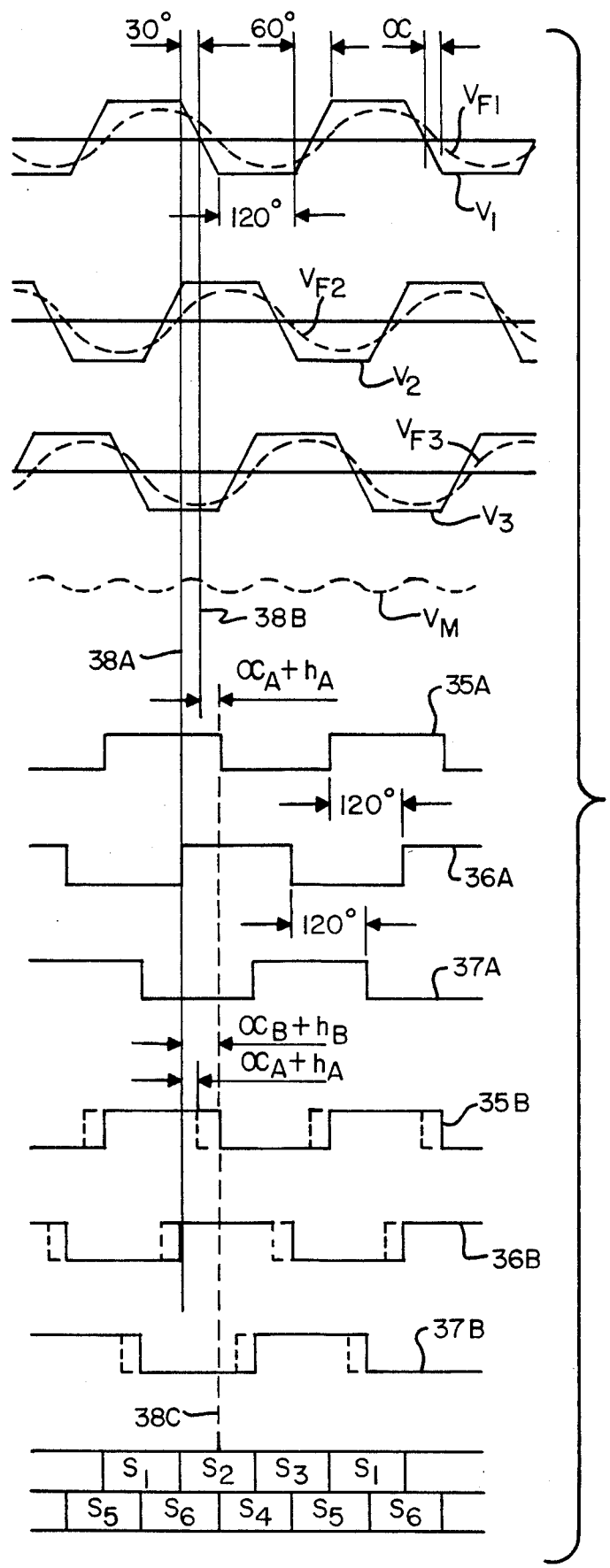
FIG. 3 shows a graph plotting the time period the voltages induced in each phase, the respective filtered values thereof, the logic signals after the comparators and active periods for each inverter switch.

Reference numeral 38A in FIG. 3 indicates the moment when the induced voltage $V_1$ becomes lower than the induced voltage $V_2$. Reference numeral 38B is the moment when induced voltage $V_1$ becomes lower than the average value between $V_1$, $V_2$ and $V_3$.

The phase difference between points 38A and 38B is always 30°. The same difference of 30° is noted when the recomposed signals $V_{F1}$, $V_{F2}$ and $V_{F3}$ are compared as described above, resulting in logic signals 35, 36 and 37 (FIG. 3) which are out of phase by 120° between them. The utilization of this property of the constant 30° displacement between logic signals in the two comparison form, plus the effects obtained with the comparators hysteresis allows that the final result of the comparisons is constant without needing complex circuits, therefore making use of few passive components and the formation of a simple and adequate circuit for mass production is possible.

Figure 7:
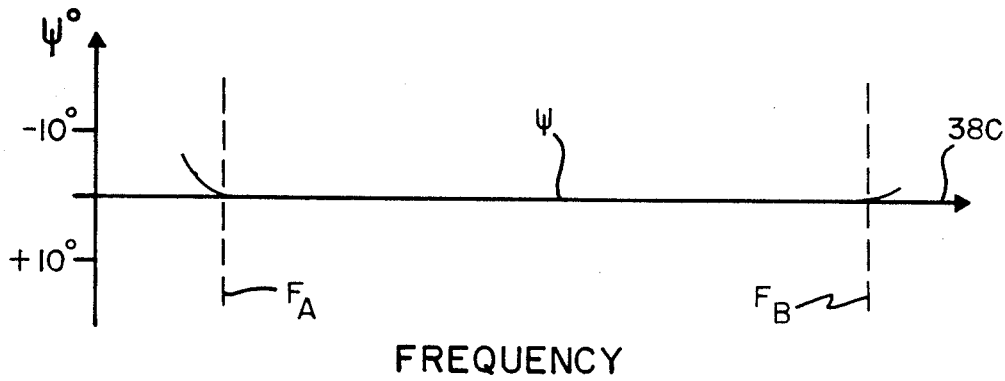
FIG. 7 shows a graph for the $\psi$ angle evolution as obtained by the proposed circuit over the entire frequency range of the induced voltage.

In the minimum working frequency $F_A$ shown in FIGS. 6 and 7, the voltage at points $M_1$, $M_2$ and $M_3$ (FIG. 5) is substantially equal to the average voltage $V_M$. This means that the comparison occurs between this average voltage $V_M$ and each voltage $V_{F1}$, $V_{F2}$ and $V_{F3}$, and from this comparison results the logic signals 35A, 36A and 37A (FIG. 3).

Said logic signals 35A, 36A and 37A in relation to the reference 38B are delayed by phase angle $\alpha A = h_A$. The circuit has to be designed in order that, in the frequency $F_A$ (FIGS. 6 and 7) corresponding to the minimum working speed of the motor 20, the $\alpha A = h_2$ phase delay of the logic signals 35A, 36A and 37A is equal to 30°, and the transition moments of the logic signals 35A, 36A and 37A (FIG. 3) are coincident to reference 38C.

Thus, the command signals $S_1$ to $S_6$ generated by logic combinations between signals 35A, 36A and 37A will feed currents $I_1$, $I_2$ and $I_3$ (FIG. 4) through coils 21, 22 and 23 (FIG. 1) in phase with the voltages $V_1$, $V_2$ and $V_3$ (FIG. 4) induced therein, in which condition the angle is equal to zero.

The $\alpha A = h_A$ angle is the sum of the $\alpha A$ delay angle caused by the low pass filters and $h_A$ delay angle caused by the hysteresis of the voltage comparators 59, 60 and 61. This hysteresis is a function of the proportion of the values of the resistors 57 and 58. This hysteresis is used to cause a $h_A$ delay (FIG. 6) in the logic signals 35, 36 and 37 resulting from the comparisons of voltages, which delay increases with the rotor speed as per graph in FIG. 6. The hysteresis also provides immunity to the voltage comparators 59, 60 and 61 from noises and residual waviness which are not eliminated by the low pass filters 1, 2 and 3.

For high frequencies $F_B$ (FIGS. 6 and 7) the voltages at the points $M_1$, $M_2$ and $M_3$ (FIG. 5) are substantially equal to voltages $V_{F2}$, $V_{F3}$ and $F_{F1}$ respectively due to the high pass, filters formed by capacitors 56 and resistors 55. This means that the comparison effectively occurs between voltages $V_{F1}$ and $V_{F2}$, $V_{F2}$ and $V_{F3}$ and between $V_{F3}$ and $V_{F1}$, resulting from these comparisons the logic signals 35B, 36B and 37B respectively (FIG. 3).

The logic signals 35B, 36B and 37B for the frequency $F_B$ (FIGS. 6 and 7) are delayed by $\alpha B = h_B$ angle in relation to the reference 38A (FIG. 3).

The circuit has to be designed in order that, in the frequency $F_B$ (FIGS. 6 and 7) corresponding to the maximum working speed of the motor 20, the $\alpha B = h_B$ delay of the logic signals 35B, 36B and 37B (FIG. 3) is equal to 60°, causing the transition moments of the logic signals 35B, 36B and 37B to coincide also to the reference 38C (FIG. 3).

There is a combined effect in the intermediate frequencies to $F_A$ and $F_B$ (FIGS. 6 and 7) which keeps the signals 35, 36 and 37 (FIG. 3) always in phase with the reference 38C.

This way, $\psi$ angle as shown in FIG. 7 is kept equal to zero between the frequencies $F_A$ and $F_B$ which is the useful range of motor speed.

What is claimed is:

1. An electronic control circuit for a brushless direct current motor of the type having stator coils and a permanent magnet rotor which produces an induced voltage in each stator coil upon rotor rotation, comprising:

inverter means for supplying current separately to each of the stator coils;

a rotor-stator relative position detecting circuit comprising:

a low pass filter for each stator coil for receiving the voltage induced therein;

a plurality of voltage comparator means, each for producing control signals to be used to control said inverter means, each said comparator means having a first input for receiving the voltage output of one of the low pass filters; p1 means for producing an average of the voltage at the outputs of the low pass filter and applying the average voltage to a second input of each of the comparator means; and a respective high pass filter means connected to the output of each low pass filter, the output of each high pass filter means being applied to the second input of the comparator means different from the comparator means receiving the output of the low pass filter at the first input.

2. An electronic control circuit as in claim 1 wherein said first and second input of each comparator means respectively is a non-inverting input and an inverting input.

3. An electronic control circuit as in claim 1 wherein the phase of current supplied to each stator coil differs by 360°/n, where n is the number of stator coils and each high pass filter means supplies its output to the second input of the comparator means whose first input receives the voltage from the low pass filter which receives the induced voltage from the stator coils whose phase differs by 360°/n.

4. An electronic control circuit as in claim 1 wherein each of said comparator means includes means for producing a phase delay between its input and output signals.

5. An electronic control circuit as in claim 1 wherein the means for producing the average voltage comprises a resistor means for each low pass filter, said resistor means having one end connected to the output of a respective low pass filter and the other end connected to a common point, and further comprising resistor means connected between the common point and the second input of each comparator means for supplying the average voltage thereto.

6. An electronic control circuit as in claim 5 wherein the resistor means connected to the second inputs of the comparator means have higher values than the resistor means connected to the outputs of the low pass filters.

* * * * *

UNITED STATES PATENT AND TRADEMARK OFFICE
CERTIFICATE OF CORRECTION

PATENT NO. : 4,978,895
DATED : December 18, 1990
INVENTOR(S) : Marcos G. Schwarz It is certified that error appears in the above—identified patent and that said Letters Patent is hereby corrected as shown below:

ON THE TITLE PAGE:
Please correct the bibliographic data code for the inventor from "76" to --75--. Also, please add the name of the Assignee, which is --Empresa Brasileira de Compressores S.A. - EMBRACO--.

Signed and Sealed this

Fifteenth Day of December, 1992

Attest:

DOUGLAS B. COMER

*Attesting Officer*   Acting Commissioner of Patents and Trademarks